(12) United States Patent
Jung et al.

(10) Patent No.: US 7,864,283 B2
(45) Date of Patent: Jan. 4, 2011

(54) LIQUID CRYSTAL DISPLAY

(75) Inventors: Min-Sik Jung, Seoul (KR); Baek-kyun Jeon, Yongin-si (KR); Joo-han Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 305 days.

(21) Appl. No.: 12/013,213

(22) Filed: Jan. 11, 2008

(65) Prior Publication Data

US 2008/0239226 A1    Oct. 2, 2008

(30) Foreign Application Priority Data

Jan. 26, 2007   (KR) .................... 10-2007-0008606

(51) Int. Cl.
   *G02F 1/1339*   (2006.01)
(52) U.S. Cl. ................... 349/154; 349/153; 349/189; 349/190
(58) Field of Classification Search ........... 349/154
   See application file for complete search history.

(56) References Cited

U.S. PATENT DOCUMENTS

| 7,433,011 | B2 * | 10/2008 | Liao ........................... 349/153 |
| 2001/0033357 | A1 * | 10/2001 | Niwa et al. ................. 349/154 |
| 2003/0025868 | A1 * | 2/2003 | Hiroshima et al. .......... 349/156 |
| 2004/0257518 | A1 * | 12/2004 | Jang et al. ................... 349/155 |
| 2007/0211203 | A1 * | 9/2007 | Niwa et al. ................. 349/154 |

* cited by examiner

*Primary Examiner*—David Nelms
*Assistant Examiner*—Thanh-Nhan P Nguyen
(74) *Attorney, Agent, or Firm*—Innovation Counsel LLP

(57) ABSTRACT

A liquid crystal display is provided with a control pattern to allow liquid crystal and a sealing agent to desirably flow during a liquid crystal injection process. The liquid crystal display includes an insulating substrate, a plurality of thin film transistors formed on the insulating substrate, a liquid crystal injection opening formed in a portion outside a region where the plurality of thin film transistors is formed, a first display panel including a plurality of control patterns formed in the liquid crystal injection opening, and a second display panel disposed to face the first display panel.

9 Claims, 17 Drawing Sheets

LIQUID CRYSTAL DISPLAY

CROSS REFERENCE TO RELATED APPLICATION

This application claims priority from Korean Patent Application No. 10-2007-0008606 filed on Jan. 26, 2007 in the Korean Intellectual Property Office, the disclosure of which is incorporated herein by reference in its entirety.

BACKGROUND OF THE INVENTION

1. Field of the Invention

The present invention relates to a liquid crystal display and, more particularly, to a liquid crystal display that is provided with a control pattern to allow liquid crystal and a sealing agent to desirably flow during a liquid crystal injection process.

2. Description of the Related Art

The liquid crystal display is provided with two substrates on which electrodes are formed, and a liquid crystal layer that is interposed between the substrates. Voltage is applied to the electrodes to rearrange liquid crystal molecules of the liquid crystal layer, thereby controlling the quantity of transmitted light.

A plurality of wiring lines is formed on an insulating substrate by a photolithography process in which constituent substances are deposited and then patterned using masks. However, since the photolithography process includes a plurality of processes such as deposition of a thin film, application of a photoresist, alignment of a mask, exposing, developing, etching, and stripping, processing time and product cost are increased.

Among the plurality of processes, a lift-off process is used to reduce the number of mask processes. In the production of the first display panel, a photoresist pattern, an upper surface of which is coated with a conductive substance, is removed using a stripper. In order to effectively remove the photoresist pattern, it is required that a passivation layer provided under the photoresist pattern be over etched to undercut the photoresist pattern by a desirable amount.

A kind of control pattern may be additionally provided to the first display panel in order to effectively remove the photoresist pattern. However, the control pattern obstructs the flow of the liquid crystal or the sealing agent during the liquid crystal injection process, causing an increase in the fraction of defective liquid crystal panels. Therefore, there is a need for a control pattern that is capable of effectively removing the photoresist pattern without obstructing the flow of the liquid crystal or the sealing agent.

SUMMARY OF THE INVENTION

According to an aspect of the present invention, a liquid crystal display includes a first panel having an insulating substrate, a plurality of thin film transistors formed on the insulating substrate, a liquid crystal injection opening formed in a portion outside a region where the plurality of thin film transistors is formed, a plurality of control patterns formed in the liquid crystal injection opening, and a second display panel disposed to face the first display panel.

BRIEF DESCRIPTION OF THE DRAWINGS

The above and other features and advantages of the present invention will become more apparent by describing in detail preferred embodiments thereof with reference to the attached drawings in which.

DESCRIPTION OF THE PREFERRED EMBODIMENTS

It will be understood that when an element or layer is referred to as being "on" another element or layer, it can be directly on to the other element or layer or intervening elements or layers may be present. In contrast, when an element is referred to as being "directly on" another element or layer, there are no intervening elements or layers present. Embodiments of the present invention will be described in detail with reference to the accompanying drawings hereinafter.

Figure 1A:
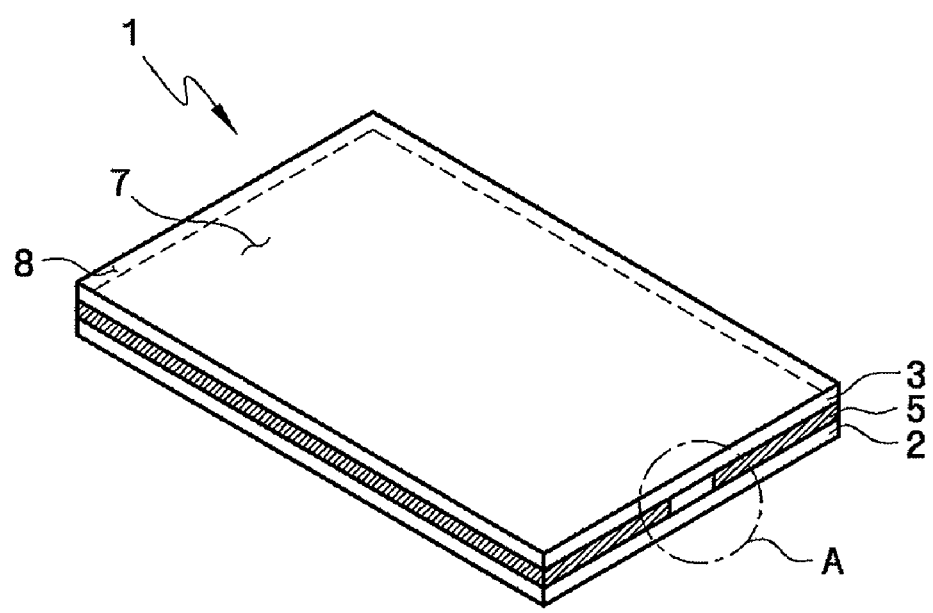
FIG. 1A is a perspective view of a liquid crystal panel according to an embodiment of the present invention.
Figure 1B:
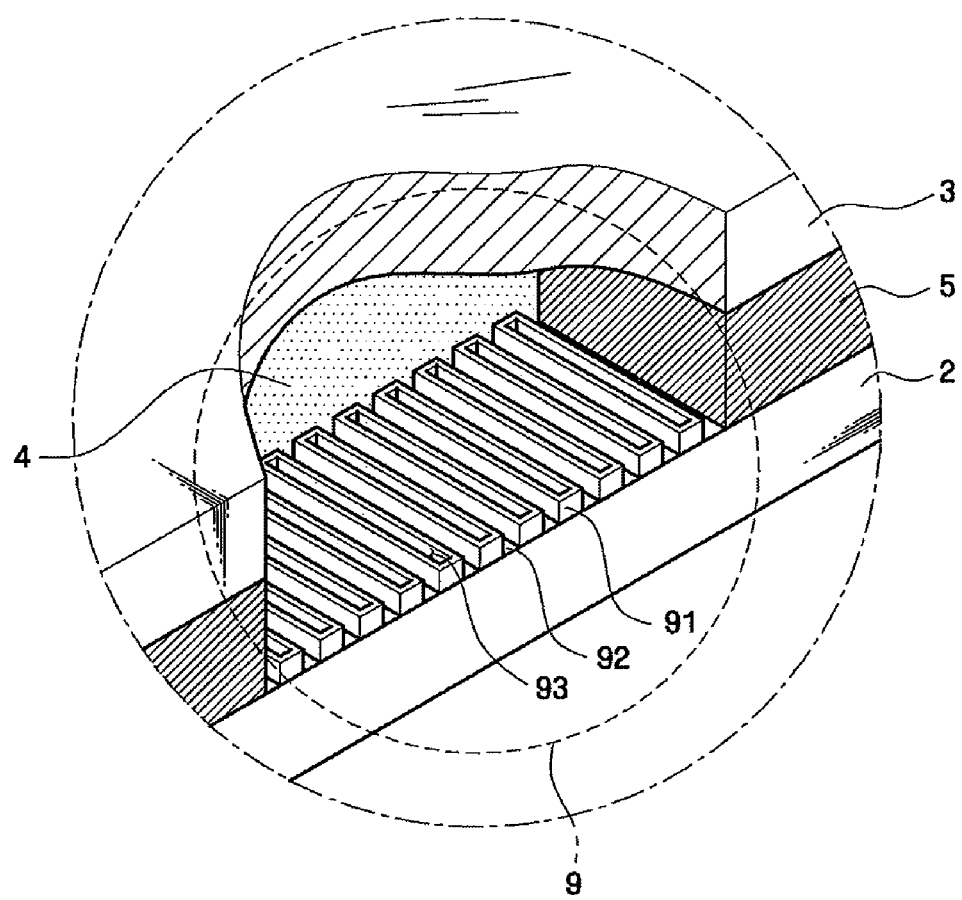
FIG. 1B is an enlarged view of a portion A of the liquid crystal panel of FIG. 1A.
Figure 2A:
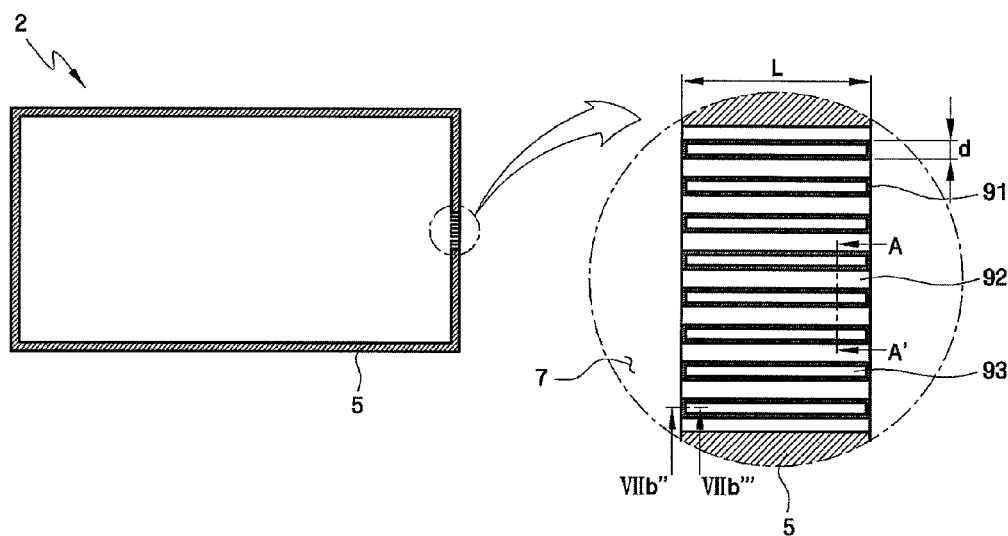
FIG. 2A is a plan view of a first display panel that is included in the liquid crystal panel of FIG. 1A.
Figure 2B:
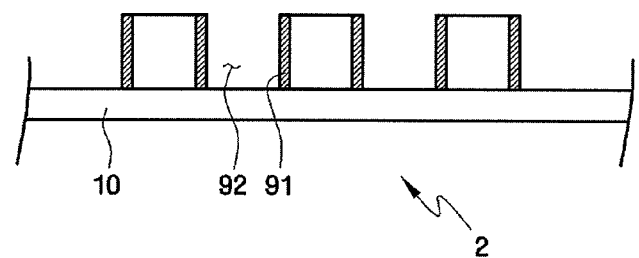
FIG. 2B is a cross-sectional view of the first display panel of FIG. 2A taken along the line A-A'.

A liquid crystal display according to an embodiment of the present invention will be described in detail with reference to FIGS. 1A to 2B. FIG. 1A is a perspective view of a liquid crystal panel according to the embodiment of the present invention, FIG. 1B is an enlarged view of a portion A of the liquid crystal panel of FIG. 1A, FIG. 2A is a plan view of a first display panel that is included in the liquid crystal panel of FIG. 1A, and FIG. 2B is a cross-sectional view of the first display panel of FIG. 2A taken along the line A-A'.

The liquid crystal display according to the embodiment of the present invention includes a liquid crystal panel 1 that is formed of a first display panel 2, a second display panel 3, and a liquid crystal 4, and a backlight assembly (not shown) that provides light to the liquid crystal panel 1.

The liquid crystal panel 1 receives electric signals to display images on a screen, and includes the first display panel 2 and the second display panel 3 that face each other with a predetermined interval therebetween and are attached to each other while the liquid crystal 4 having molecules arranged in a predetermined direction is provided between the two display panels.

The liquid crystal panel 1 is divided into a first region 7 in which a thin film transistor array is formed and a second region 8 that is formed at edges of the first region 7. The first region 7 and the second region 8 that are given in the following description may be used to divide the regions of the liquid crystal panel 1, and may have the same meaning in the case of the first display panel 2 or the second display panel 3.

The first region 7 is a region of the liquid crystal panel 1 that displays the images, and the second region 8 is a margin in the production process of the liquid crystal panel 1. The second region 8 includes control patterns 91 thereon to improve efficiency of the production process of the first display panel 2. It is required that the control patterns 91 are formed so that the liquid crystal 4 and the sealing agent 5 desirably flow during the injection process of the liquid crystal as described below.

The control patterns 91 functions to reduce differences in height between the first region 7 and the second region 8 in order to effectively remove a photoresist pattern 122 as described below. Since the control patterns 91 each have walls having a predetermined height, the cross-sectional view of each of the control patterns has a stripe shape, and the walls of the control patterns 91 protrude from a first insulating substrate 10 toward the upper side of the first insulating substrate. Space portions 92 are formed between the control patterns 91. The control patterns 91 are formed in the first region 7 and extend to the second region 8. That is, the control patterns 91 are formed so that the strips extend from the first region 7 to the outside region. In addition, it is preferable that each of the control patterns 91 be formed to have the length L of 1 to 2 mm which is almost the same as the width of the second region 8 and the width d of about 50 to 100 μm.

So that the control patterns 91 remove differences in height between the first region 7 and the second region 8 and enable the liquid crystal 4 or the sealing agent 5 to desirably flow during the injection process of the liquid crystal, indentation portions 93 are formed in the control patterns 91. The liquid crystal or the sealing agent 5 that is injected into the control patterns 91 may desirably flow from the outside to the first region 7 through the indentation portions 93.

The space portions 92 are formed between the control patterns 91, and directly connect the first region 7 to the outside region. Predetermined space portions 92 are formed between the control patterns 91 in order to reduce resistance to the flow of the liquid crystal 4 or the sealing agent 5 because the interval between the first display panel 2 and the second display panel 3 is very small. Otherwise, the control patterns 91 would present very large resistance for the flow of liquid crystal 4 or the sealing agent 5. Accordingly, the space portions 92 and the indentation portions 93 may effectively reduce the flow resistance substantially when the liquid crystal 4 or the sealing agent 5 is injected. In consideration of the removal of the difference in height between the first region 7 and the second region 8 and the resistance of the liquid crystal 4 or the sealing agent 5, it is preferable that the height of each of the control patterns 91 be in the range of about 0.2 to 1.0 μm.

The control patterns 91 may be formed in conjunction with gate insulating layer 30 and passivation layer 70. That is, the control patterns may be formed of a double layer including gate insulating layer 30 and passivation layer 70, or any one layer thereof. The control patterns 91 may be made of the same substance as gate wiring lines 21 and 22, data wiring lines 62, 65, and 66, or a semiconductor layer 40, if necessary. The control patterns 91 may be formed in the entire second region 8. Alternatively, the control patterns 91 are formed in at least a liquid crystal injection opening 9.

The sealing agent 5 is applied to the second region 8 to attach the first display panel 2 and the second display panel 3 to each other and prevent the liquid crystal 4 from leaking.

During the injection process of the liquid crystal, the sealing agent 5 is applied to a portion of the region 8 of the liquid crystal panel 1 other than the liquid crystal injection opening 9, and the liquid crystal panel 1 to which the sealing agent 5 is applied is contained in a liquid crystal container 220 (see FIG. 3) while a vacuum is created in the liquid crystal panel 1. The injection process of the liquid crystal will be described in detail below.

The first display panel 2 is a transistor panel that is produced using a thin film formed by means of a vacuum deposition process. The thin film transistor acts as a switch to apply electric signals to the liquid crystal. Constituent elements of the first display panel will be described in detail along with a method of producing the first display panel.

As to the second display panel 3, light that is provided through a backlight assembly (not shown) permeates a color filter (not shown) to display images. The second display panel 3 is formed of a color filter that is used to realize colors on the second insulating substrate, a black matrix that separates cells of the color filter and blocks light, and a common electrode (not shown) that is a transparent electrode applying a voltage to the liquid crystal cell.

The backlight assembly (not shown) provides light to the liquid crystal panel. The backlight assembly (not shown) includes a lamp emitting light, and is classified into an edge type in which the lamp is provided at a lateral surface of a light guide plate and a direct type in which the lamp is provided at a lower portion of a diffusion plate according to the position of the lamp.

The process of injecting the liquid crystal of the liquid crystal display according to the embodiment of the present invention will be described in detail with reference to FIGS. 3 to 6 hereinafter. FIGS. 3 to 6 are views that illustrate the injection of the liquid crystal to the liquid crystal panel.

During the process of injecting the liquid crystal of the liquid crystal display according to the present invention, the sealing agent 5 is first applied to the edges of the first display panel 2 and the common substrate display panel 3 so that the liquid crystal injection opening 9 is formed. Next, a vacuum is created in the liquid crystal panel 1, and the liquid crystal panel 1 is provided into the liquid crystal container 220 so that the liquid crystal injection opening 9 is completely immersed in the liquid crystal; thereby the liquid crystal is injected. With respect to this, each step will be described in detail with reference to the drawings.

Figure 3:
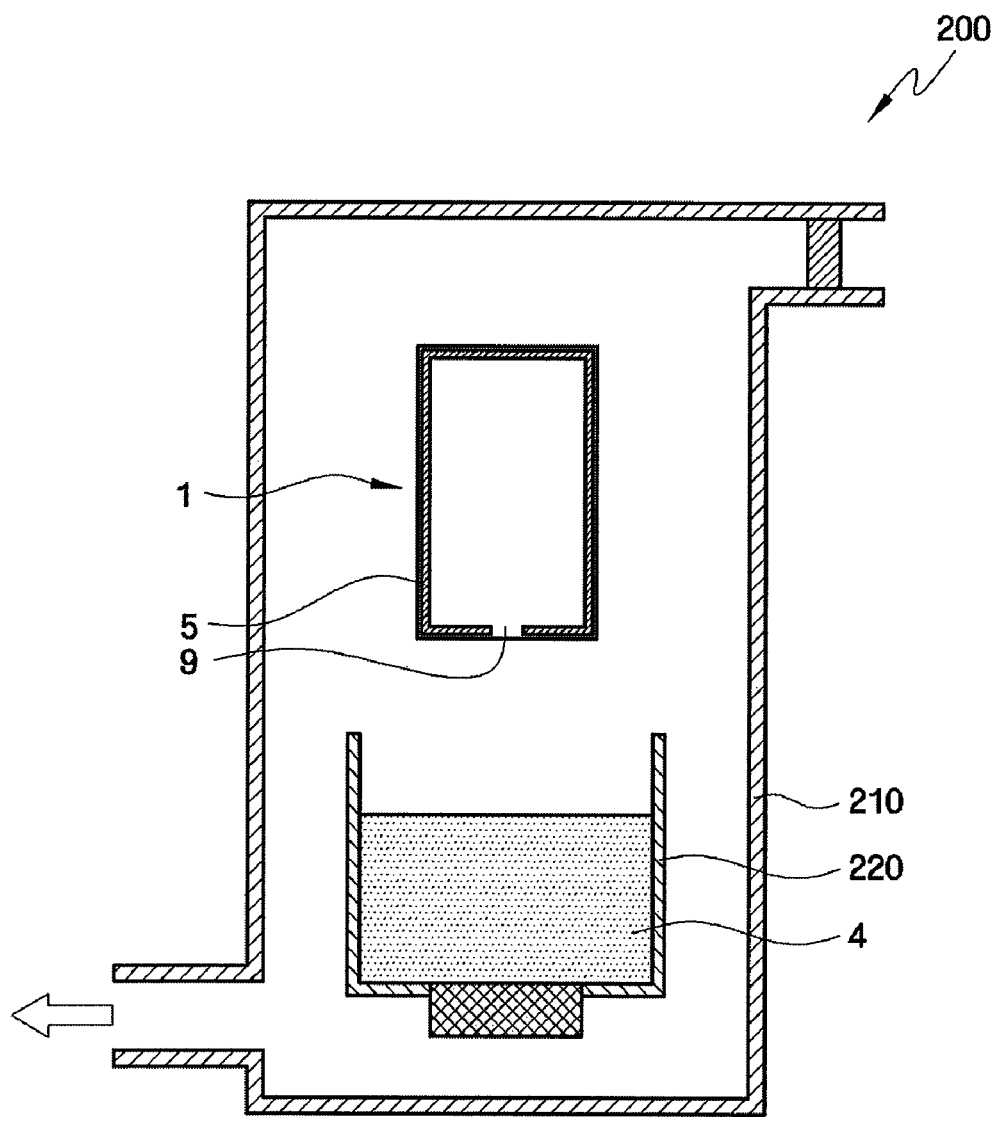
FIGS. 3 to 6 are views that illustrate the injection of liquid crystal to the liquid crystal panel.

First, with reference to FIGS. 3 and 1A, the first display panel 2 and the second display panel 3 are subjected to an alignment treatment process to align the liquid crystal, and spacers (not shown) are dispersed between the first display panel 2 and the second display panel 3 to maintain the interval between the first display panel and the second display panel.

After the sealing agent 5 is applied to at least one display panel of two display panels in order to prevent the liquid crystal from leaking, two substrates are combined with each other using a hot press process. The resulting liquid crystal panel 1 is loaded into a chamber 210 of a liquid crystal injector 200.

Next, if air is discharged from the chamber 210 to create a high vacuum in the chamber 210, the inside of the liquid crystal panel 1 that is surrounded by the sealing agent 5 is in a high vacuum atmosphere like the chamber 210.

Figure 4:
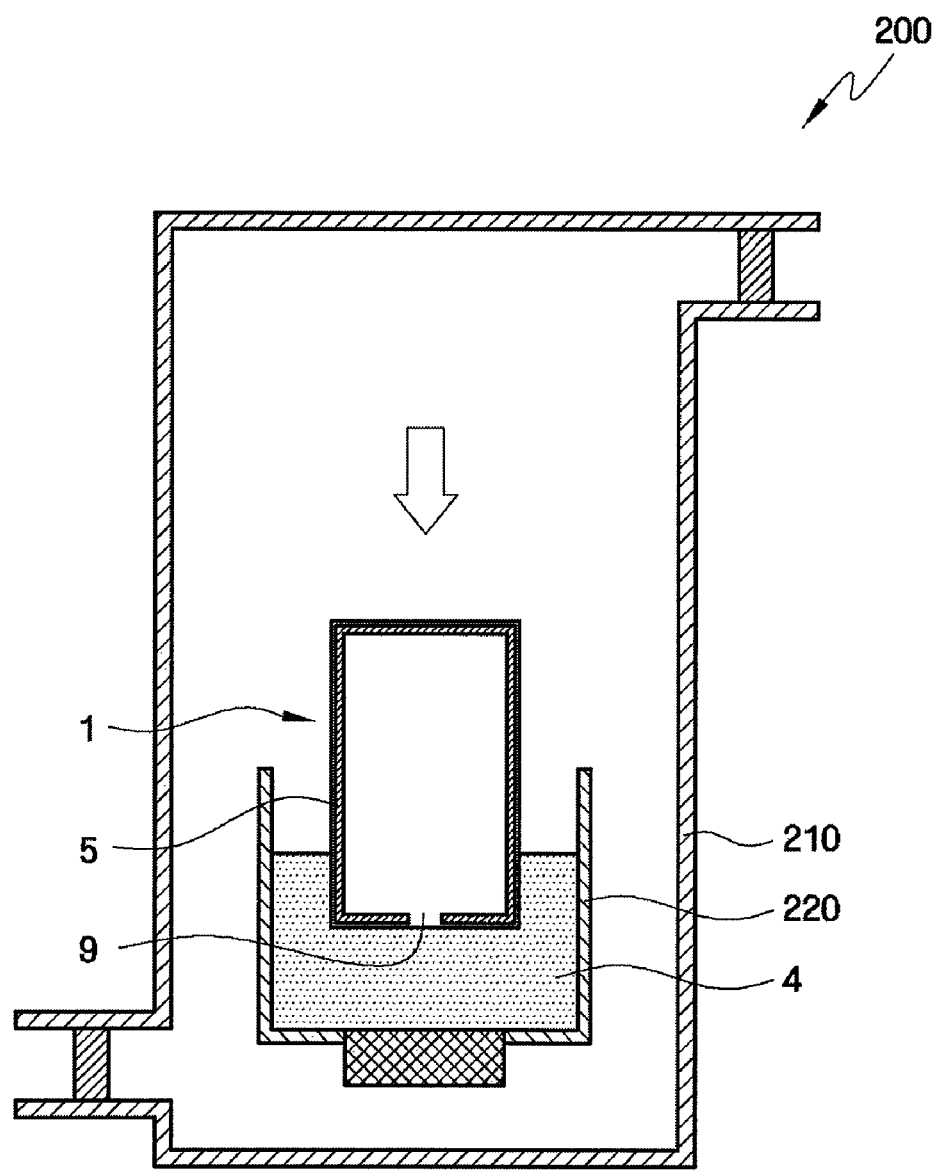

Next, as shown in FIG. 4, the chamber 210 is sealed airtight so as to be isolated from the outside. Thereby, the high vacuum state is maintained in the chamber 210. The liquid crystal panel 1 is provided into the liquid crystal container 220 while the high vacuum state is maintained in the chamber 210 so that the liquid crystal injection opening 9 is completely immersed in the liquid crystal 4. In connection with this, since the inner pressure and the outer pressure of the liquid crystal panel 1 are the same as each other, the liquid crystal 4 is not injected into the liquid crystal panel 1.

Figure 5:
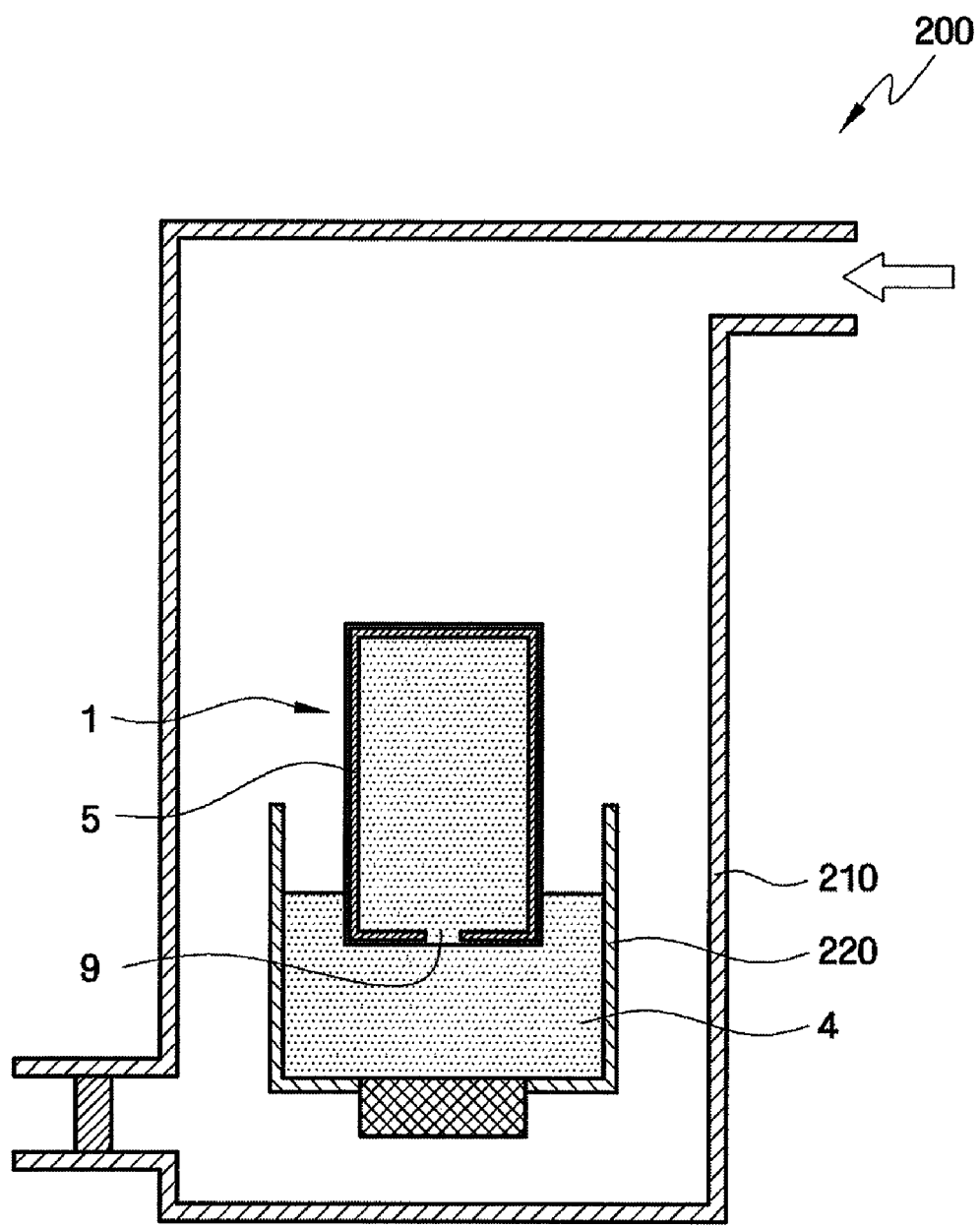

Next, as shown in FIG. 5, gas is injected into the chamber 210 to lower the vacuum or achieve a normal pressure state in the chamber 210. The above-mentioned gas may be $N_2$. Even though the inside of the chamber 210 is in the low vacuum state or the normal pressure state, the inside of the liquid crystal panel 1 that is surrounded by the sealing agent 5 is in the high vacuum state. Accordingly, there is a difference in pressure of the inside and the outside of the liquid crystal panel 1, and the liquid crystal 4 is injected through the liquid crystal injection opening 9 into the liquid crystal panel 1 due to the difference in pressure. Since the control patterns 91 that are formed in the second region 8 of the first display panel 2 include the space portions 92, the liquid crystal 4 desirably flows to reduce the time required to inject the liquid crystal 4 and the injection is desirably performed.

Figure 6:
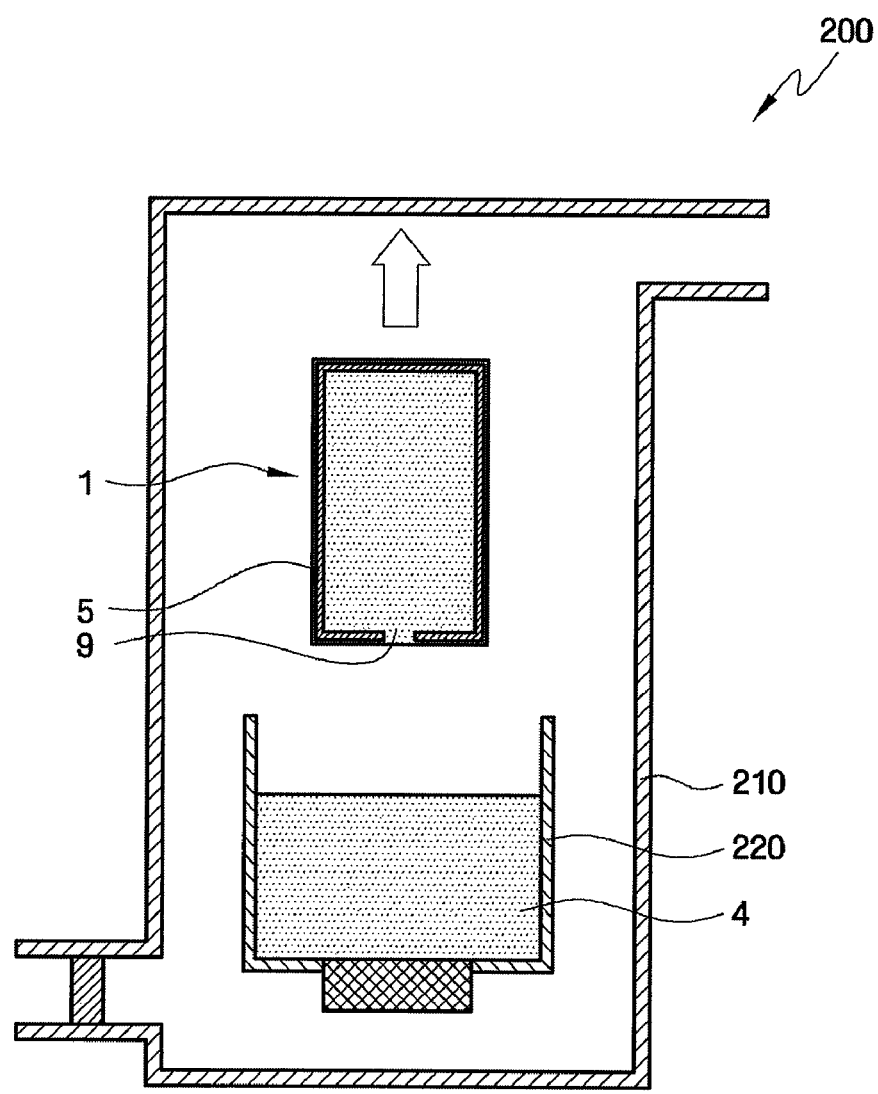

Next, as shown in FIG. 6, the liquid crystal panel 1 that is filled with the liquid crystal 4 is drawn from the liquid crystal container 220 and the liquid crystal injection opening 9 is sealed while the inside of the chamber 210 is maintained at normal pressure, thereby the injection of the liquid crystal is achieved. In connection with this, the sealing agent 5 desirably flows into the second region 8 in which the control patterns 91 are formed during the sealing the liquid crystal injection opening 9.

Figure 7A:
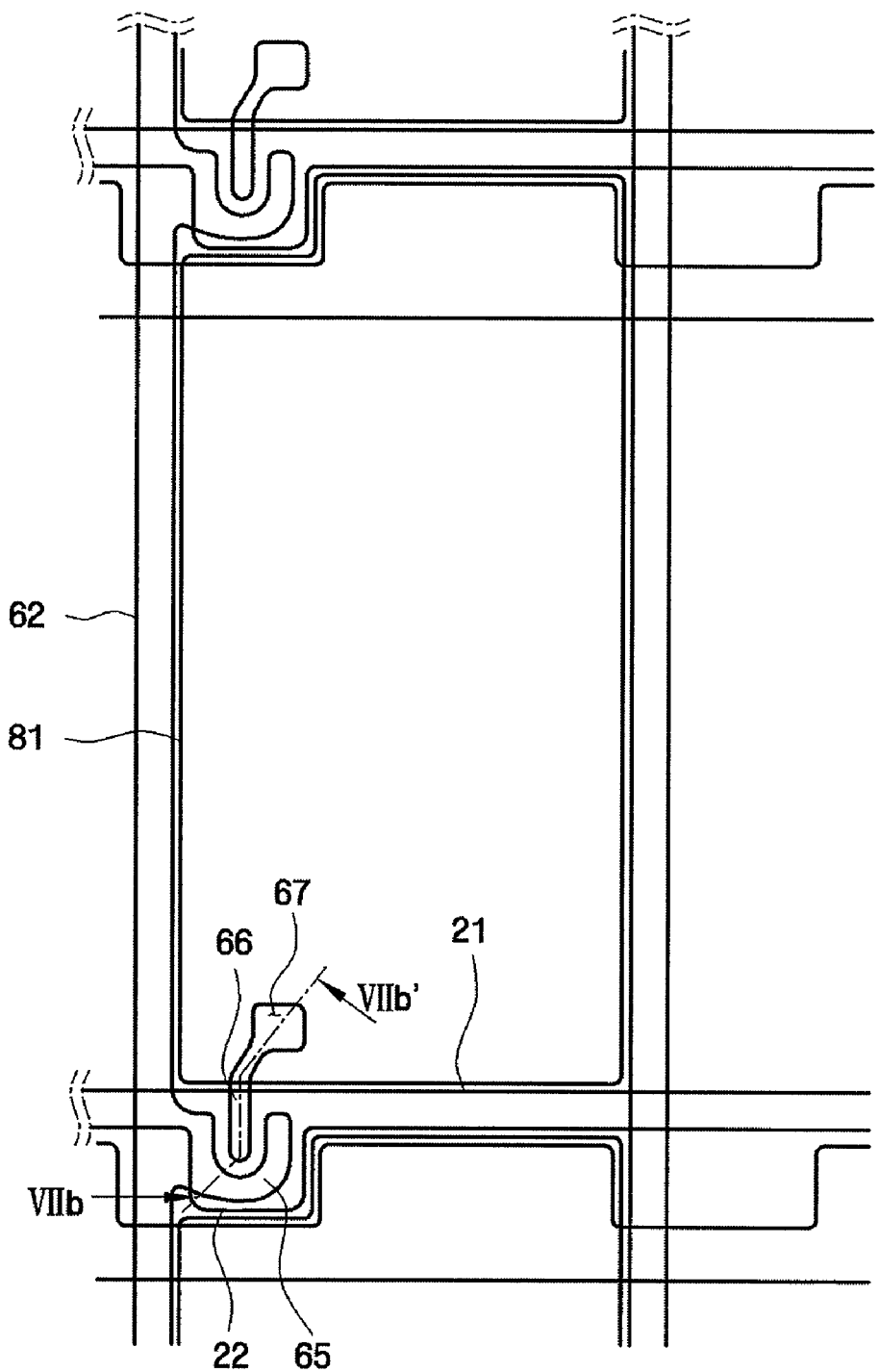
FIG. 7A is a layout view of the first display panel that is included in the liquid crystal panel of FIG. 1A.
Figure 7B:
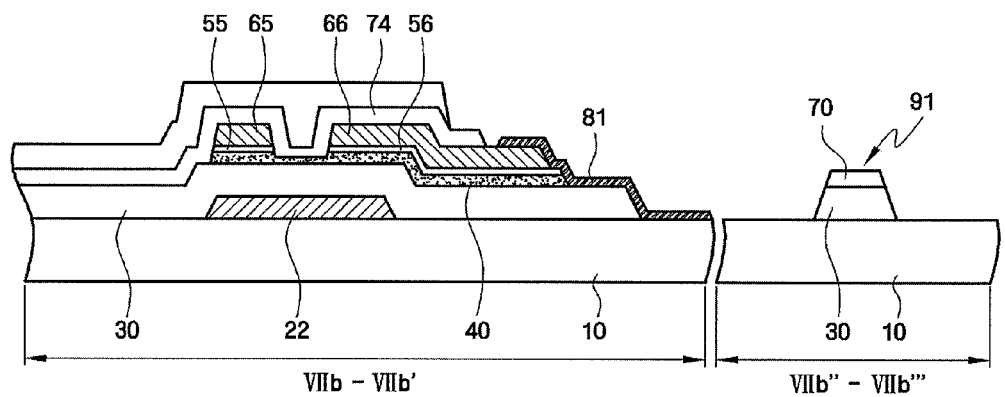
FIG. 7B is a cross-sectional view of the first display panel of FIG. 7A taken along the line VIIb-VIIb'.

The first display panel will be described in detail with reference to FIGS. 7A and 7B hereinafter. FIG. 7A is a layout view of the first display panel that is included in the liquid crystal panel of FIG. 1A, and FIG. 7B is a cross-sectional view of the first display panel of FIG. 7A taken along the line VIIb-VIIb'.

The first display panel 2 includes gate wiring lines 21 and 22, a gate insulating layer 30, a semiconductor layer 40, ohmic contact layer patterns 55 and 56, data wiring lines 62, 65, and 66, a passivation layer 70, control patterns 91, and a pixel electrode 81 that are formed on the first insulating substrate 10.

The first insulating substrate 10 is made of a material having predetermined heat resistance and light transmission such as transparent glass or plastics.

The gate wiring lines 21 and 22 are formed on the first insulating substrate 10. The two wiring lines may be formed on the same layer of the first insulating substrate 10. The gate wiring lines 21 and 22 may be made of a metallic material that includes an aluminum-based metal, such as aluminum (Al) and an aluminum alloy, a silver-based metal, such as silver (Ag) and a silver alloy, a copper-based metal, such as copper (Cu) and a copper alloy, a molybdenum-based metal, such as molybdenum (Mo) and a molybdenum alloy, chromium (Cr), titanium (Ti), or tantalum (Ta). In addition, the first insulating substrate may have a multilayered structure including two conductive layers (not shown) having physical properties that are different from the gate wiring lines 21 and 22.

The gate wiring lines 21 and 22 include the gate line 21 that is disposed in a first direction of the first insulating substrate 10 and the gate electrode 22 that protrudes from the gate line 21. The gate wiring lines 21 and 22 include the gate line 21 that is disposed in the first direction, for example, a transverse direction, to transfer gate signals, and the gate electrode 22 protruding from the gate line 21. The gate electrode 22 constitutes terminals of the thin film transistor in conjunction with a source electrode 65 and a drain electrode 66 as described below.

The gate wiring lines 21 and 22 may be formed by applying PEDOT (PolyEthyleneDiOxyThiophene), which is a conductive organic polymer-based substance using a predetermined coating process, or by printing the conductive organic polymer-based substance using an inject-printing process.

The gate insulating layer 30 that is made of an inorganic insulating substance such as silicon oxide ($SiO_x$) or silicon nitride ($SiN_x$) or an organic insulating substance such as BCB (BenzoCycloButene), an acryl-based substance, or polyimide is formed on the gate wiring lines 21 and 22 and the first insulating substrate 10 to cover the gate wiring lines 21 and 22.

The gate insulating layer 30 may be formed to expose a pixel region. The pixel region is defined by the gate wiring lines 21 and 22 and the data wiring lines 62, 65, and 66, and may be considered the region through which light emitted from a backlight assembly (not shown) passes in the liquid crystal display 1 including the first display panel 2.

The semiconductor layer 40 that is made of hydrogenated amorphous silicon, polysilicon, or the conductive organic substance is formed on a portion of an upper surface of the gate insulating layer 30.

The semiconductor layer 40 may have various shapes such as an island shape or the stripe shape. For example, in the case of when the semiconductor layer has the stripe shape as shown in the present embodiment, the semiconductor layer may be provided under the data line 62 and extend to an upper portion of the gate electrode 22. The semiconductor layer 40 according to the present embodiment may substantially overlap the entire gate electrode 22 and the data wiring lines 62, 65, and 66 as described below. That is, the semiconductor layer 40 may protrude from the source electrode 65 and the drain electrode 66. However, the shape of the semiconductor layer 40 is not limited to the stripe, but may vary. If semiconductor layer 40 has an island shape, the semiconductor layer 40 may be provided on the gate electrode 22 to overlap the gate electrode 22, and also overlap at least a portion of the source electrode 65 and the drain electrode 66. The semiconductor layer 40 may be substantially the same as the data wiring lines 62, 65, and 66 as long as the channel region of the thin film transistor is excluded.

Ohmic contact layer patterns 55 and 56 that are made of silicide, n+ hydrogenated amorphous silicon in which an n-type impurity is doped at a high concentration, or ITO in which a p-type impurity is doped may be formed on the upper portion of the semiconductor layer 40. The ohmic contact layer patterns 55 and 56 make a pair, and are provided on the semiconductor layer 40 to improve the contact characteristic between the source electrode 65 and the drain electrode 66 as described below, and the semiconductor layer 40. In the case of when the contact characteristic between the semiconductor layer 40 and the source electrode 65 and the drain electrode 66 that are provided on the upper portion of the semiconductor layer 40 is acceptable, the ohmic contact layer patterns 55 and 56 may be omitted.

The data wiring lines 62, 65, and 66 and the drain electrode 66 are formed on the ohmic contact layer patterns 55 and 56 and the gate insulating layer 30. The data wiring lines 62, 65, and 66 include the data line 62, the source electrode 65, and the drain electrode 66.

The data line 62 is disposed in a second direction such as a longitudinal direction so as to intersect the gate line 22, and receives a data signal and transfers the data signal to the source electrode 65. A plurality of data lines 62 is disposed in the second direction while being parallel to each other. The data lines 62 may intersect the gate lines 22.

The source electrode 65 is branched from the data line 62. An end of the source electrode is connected to the data line 62, and another end of the source electrode is provided on the upper portion of the semiconductor layer 40. Thus, the source electrode is disposed so as to overlap the semiconductor layer 40.

The drain electrode 66 is provided on the upper portion of the semiconductor layer 40 at an end thereof so as to overlap a portion of the semiconductor layer 40, and spaced apart from the source electrode 65 to face the source electrode 65 while the gate electrode 22 is provided between the drain electrode and the source electrode.

The source electrode 65 and the drain electrode 66 constitute a switching element in conjunction with the above-mentioned gate electrode 22. Accordingly, if the voltage is applied to the gate electrode 22, the current flows between the source electrode 65 and the drain electrode 66.

Meanwhile, the data wiring lines 62, 65, and 66 may be formed of a single layer or a multilayer that is made of one or more substances selected from aluminum, chromium, molybdenum, tantalum, and titanium. That is, it is preferable that the data wiring lines 62, 65, and 66 be made of fire-resistant metal such as chromium, molybdenum-based metal, tantalum, and titanium. Additionally, the data wiring lines 62, 65, and 66 may have a multilayered structure that includes a lower fire-resistant metal layer (not shown) and an upper layer (not shown) which is made of a substance having low resistance and provided on the lower fire-resistant metal layer. Examples of the multilayered structure may include a dual layer structure that has a lower chromium layer and an upper aluminum layer or a lower aluminum layer and an upper molybdenum layer, and a triple layer structure that has a molybdenum layer, an aluminum layer, and a molybdenum layer.

The passivation layer 70 that is made of an insulating film is formed on the data wiring lines 62, 65, and 66 and the exposed semiconductor layer 40. The passivation layer 70 is made of an inorganic substance that includes silicon nitride or silicon oxide, an organic substance that has excellent planarization property and photosensitivity, or a low dielectric insulating substance, such as a-Si:C:O or a-Si:O:F, that is formed using plasma enhanced chemical vapor deposition (PECVD). Additionally, in the case of when the passivation layer 70 is made of the organic substance, the passivation layer 70 may have a dual layer structure including a lower inorganic layer that is made of silicon nitride ($SiN_x$) or silicon oxide ($SiO_2$) and an upper organic layer in order to prevent the organic substance of the passivation layer 70 from coming into contact with the exposed portion of the semiconductor layer 40 between the source electrode 65 and the drain electrode 66.

The control patterns 91 function to reduce differences in height between the first region 7 and the second region 8 in order to effectively remove a photoresist pattern 122 as described below, and a detailed description of the control patterns is as described above.

The pixel electrode 81 controls the intensity of light radiated from the backlight assembly (not shown), thereby displaying images on the liquid crystal panel. The pixel electrode 81 may be formed directly on the first insulating substrate 10 of the pixel region, and is electrically directly connected to the drain electrode expanded part 67. The pixel electrode 81 to which the data voltage is applied through the drain electrode expanded part 67 generates an electric field in conjunction with the common electrode of the second display panel 3 to control the arrangement of the liquid crystal molecules that are interposed between the pixel electrode 81 and the common electrode (not shown).

The pixel electrode 81 is made of a transparent conductive substance such as ITO (Indium Tin Oxide) or IZO (Indium Zinc Oxide), or a reflective conductive substance such as aluminum. When no voltage is applied between the pixel electrode 81 and the common electrode, light cannot permeate the liquid crystal panel.

A method of producing the first display panel according to the embodiment of the present invention will be described in detail with reference to FIGS. 7A to 7B hereinafter. FIGS. 8 to 17 are cross-sectional views that illustrate the process of the first display panel according to the embodiment of the present invention.

Figure 8:
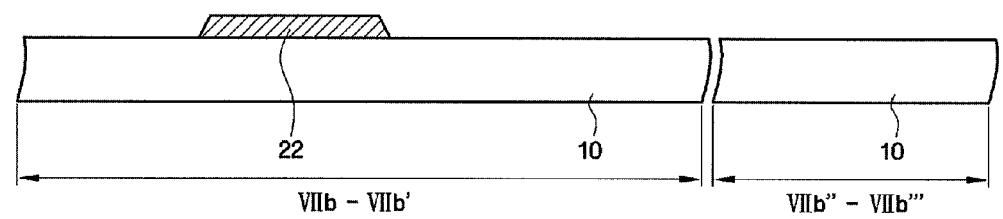
FIGS. 8 to 17 are cross-sectional views that illustrate the process of the first display panel according to the embodiment of the present invention.

First, with reference to FIGS. 8 and 7A, the gate wiring lines 21 and 22 that include the gate electrode 22 are formed on the first insulating substrate 10. A gate conductive layer is deposited on the first insulating substrate 10, for example, by sputtering, and then subjected to a photolithography process to form the gate line 21 and the gate electrode 22.

Figure 9:
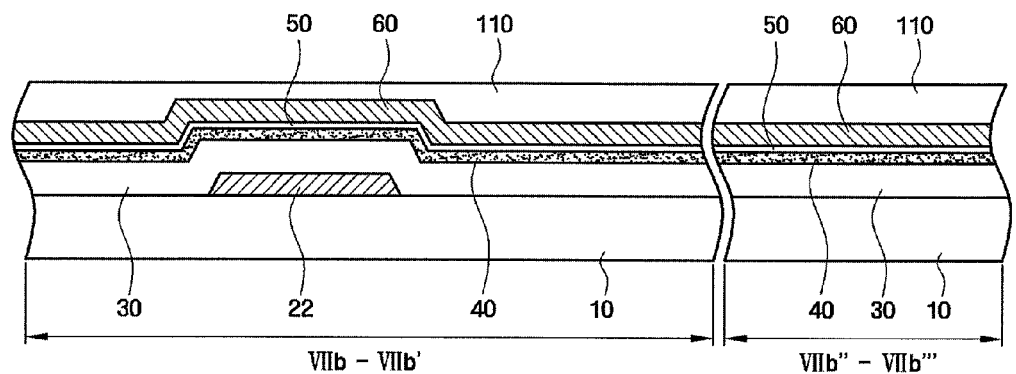

As shown in FIG. 9, the gate insulating layer 30, the semiconductor layer 40 made of hydrogenated amorphous silicon, and the ohmic contact layer 50 made of silicide, n+ hydrogenated amorphous silicon doped with an n-type impurity, or ITO doped with a p-type impurity, are deposited. The gate insulating layer 30, the semiconductor layer 40, and the ohmic contact layer 50 may be layered using, for example, chemical vapor deposition (CVD).

Subsequently, the conductive layer 60 for data wiring lines is deposited on the ohmic contact layer 50 using, for example, sputtering, and the photoresist layer 110 is applied.

The gate insulating layer 30, the semiconductor layer 40, the ohmic contact layer 50, the conductive layer 60 for data wiring lines, and the photoresist layer 110 are deposited both on the second region 8 as well as the first region 7 of the first display panel 2.

Figure 10:
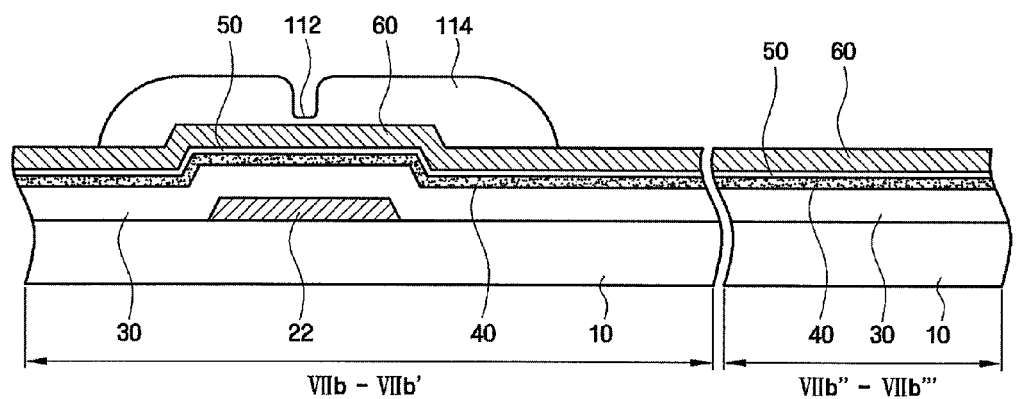

Subsequently, with reference to FIGS. 10 and 7B, the photoresist layer 110 is patterned to form data wiring lines on the conductive layer 60 for data wiring lines. The photoresist pattern 112 for data wiring lines covers the space between the source electrode 65 and the drain electrode 66. The photoresist pattern 112 for data wiring lines that includes the regions having the different thicknesses may be formed using a slit mask or a half tone mask.

Figure 11:
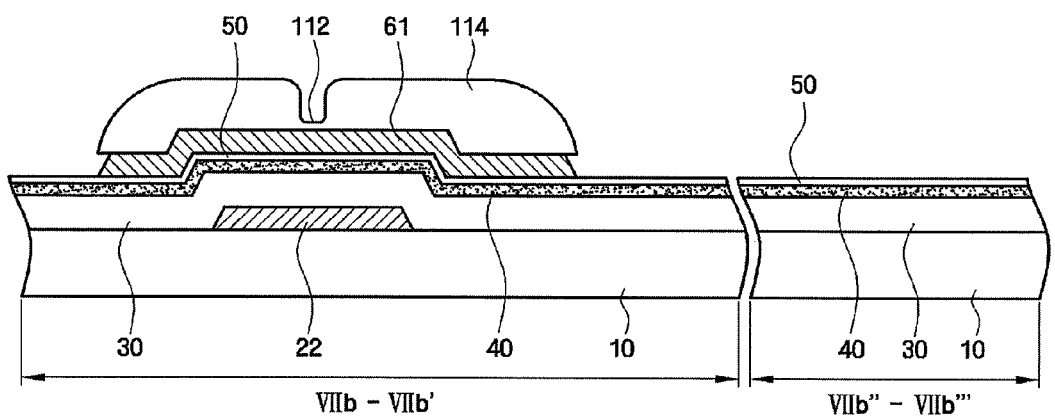

Subsequently, with reference to FIGS. 11 and 7B, the exposed conductive layer 60 for data wiring lines is etched using the photoresist pattern 112 for data wiring lines as an etching mask. The etching of the conductive layer 60 for data wiring lines depends on the type and the thickness of the conductive layer 60 for data wiring lines. Preferably, the conductive layer 60 for data wiring lines may be subjected to wet etching. As a result, the conductive layer patterns 61 for the data lines 62 and the data wiring lines are formed. The patterns of the source electrode 65 and the drain electrode 66 of the channel region are not formed, and the conductive layer patterns 61 for the data wiring lines are not separated but form a single body in the channel region.

Figure 12:
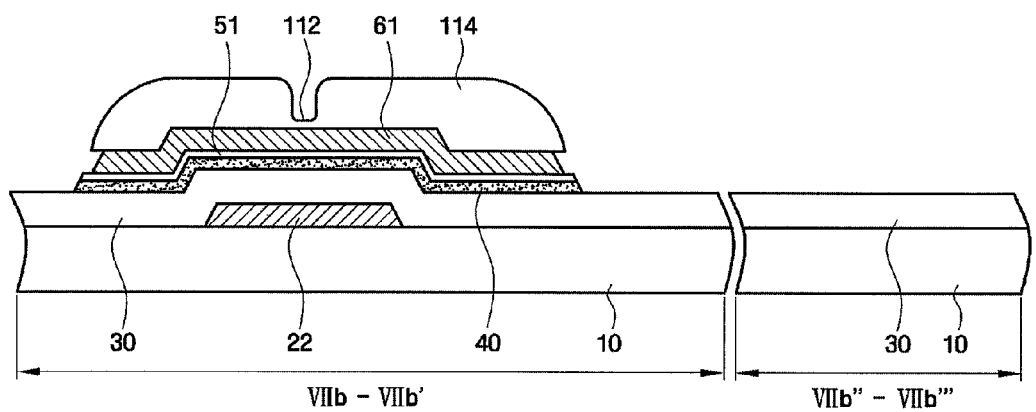

Subsequently, with reference to FIGS. 12 and 2B, the ohmic contact layer 50 that are exposed due to the formation of the conductive layer pattern 61 for data wiring lines and the semiconductor layer 40 provided under the ohmic contact layer are etched to form the imperfect ohmic contact layer pattern 51 and the imperfect semiconductor layer 40 provided under the imperfect ohmic contact layer pattern 51. The ohmic contact layer 50 and the semiconductor layer 40 may be subjected to, for example, dry etching. The ohmic contact layer 50 and the semiconductor layer 40 are etched to expose the gate insulating layer 30.

Figure 13:
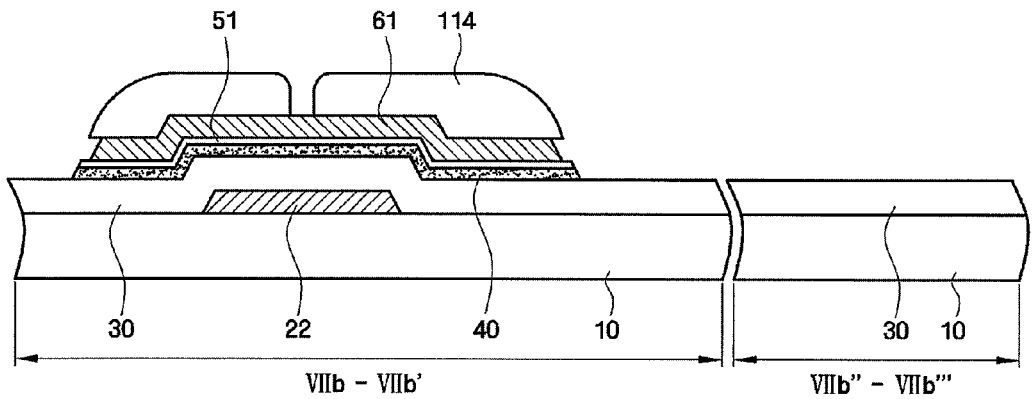

Subsequently, with reference to FIGS. 13, 12, and 7B, the photoresist pattern 112 for data wiring lines is removed to expose the conductive layer pattern 61 for data wiring lines therebeneath. The photoresist pattern 112 for data wiring lines having small thicknesses may be removed by means of, for example, an ashing process using oxygen. Meanwhile, the photoresist pattern 112 for data wiring lines may be removed before etching the ohmic contact layer 50 and the semiconductor layer 40. In this case, the ashing process may be omitted.

Figure 14:
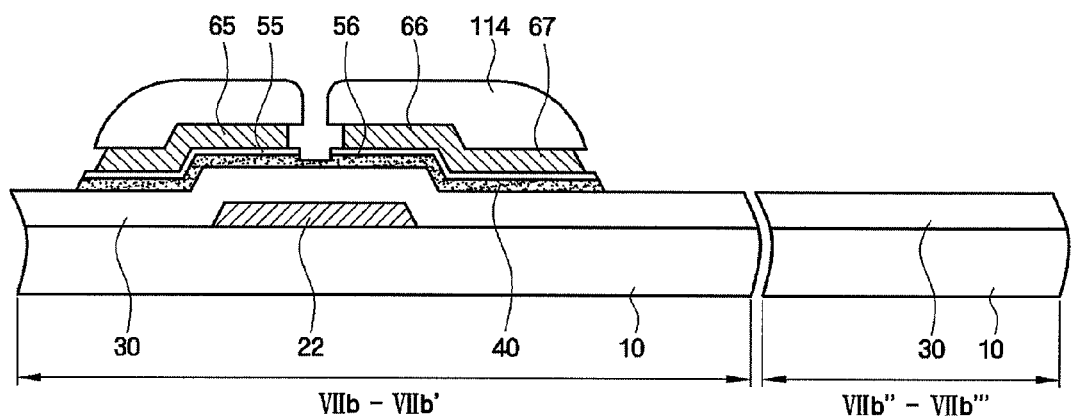

Subsequently, with reference to FIGS. 14, 13, and 7B, the exposed conductive layer pattern 61 for data wiring lines of the channel region is etched using the photoresist pattern 114 for data wiring lines having large thicknesses as the etching mask. As a result, the source electrode 65, the drain electrode 66, and the drain electrode expanded part 67 are formed, and the imperfect ohmic contact layer pattern 51 is exposed in the interval between the source electrode 65 and the drain electrode 66. Subsequently, the exposed imperfect ohmic contact layer pattern 51 is etched to perform separation. As a result, the production of the ohmic contact layer patterns 55 and 56 is finished. Furthermore, a portion of the semiconductor layer 40 is etched.

Figure 15:
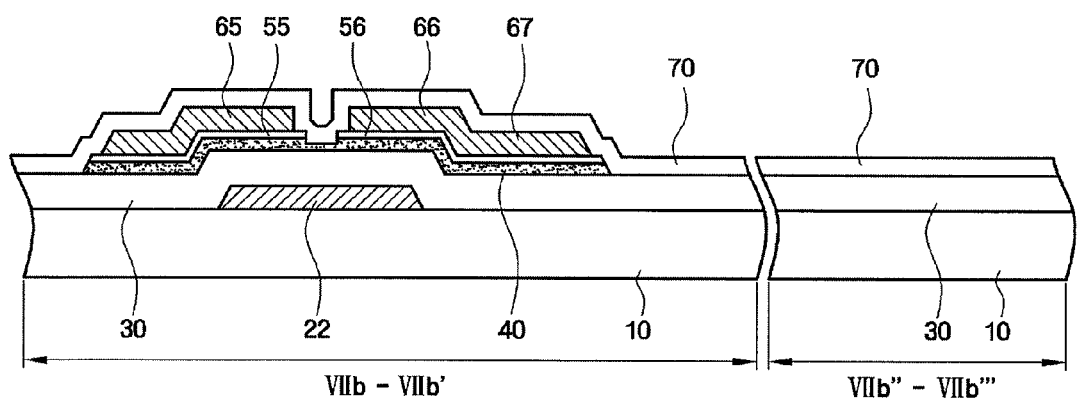

Subsequently, with reference to FIG. 15, the passivation layer 70 is layered on the resulting structure using, for example, CVD.

Figure 16:
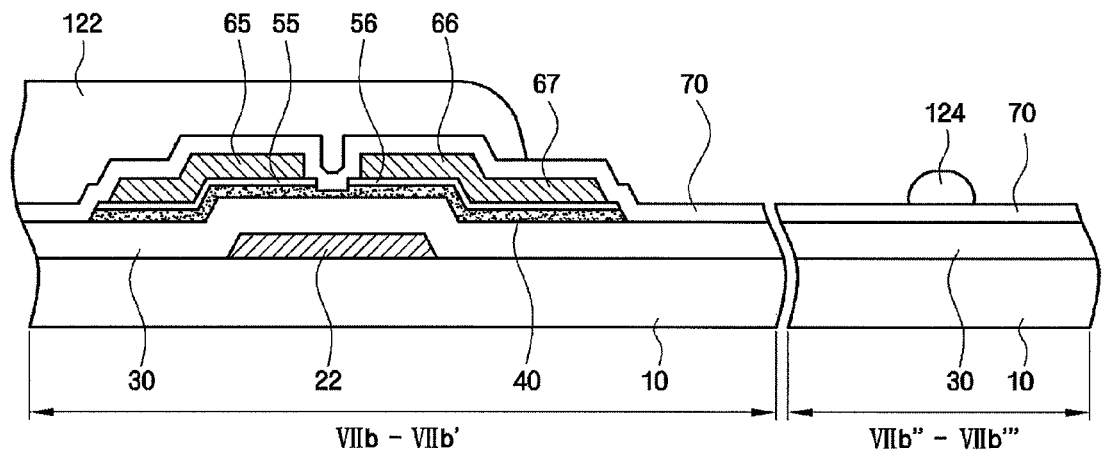

Subsequently, with reference to FIGS. 16, 15, and 7B, a photoresist substance is applied to the passivation layer 70 and then patterned to form the photoresist patterns 122 and 124. The photoresist patterns 122 and 124 are formed on the passivation layer 70 provided on the data wiring lines 62, 65, and 66 and the portion on which the control patterns 91 are to be formed, but not on the passivation layer 70 and the drain electrode expanded part 67 provided on the gate wiring lines 22 and 24. Since the mask covers the entire photoresist patterns 122 and 124, the photoresist pattern 122 and 124 are not exposed, but the pixel region is exposed.

The exposed passivation layer 70 is subjected to the etching using the photoresist patterns 122 and 124 as the etching mask. The etching of the passivation layer 70 is performed using a dry etching process. The passivation layers 70 are spaced apart from each other so as to expose a portion of the drain electrode expanded part 67 provided under the photoresist pattern 122. The gate insulating layer 30 is etched. Examples of an etching gas may include $CF_4$, $SF_6$, $CHF_3$, $O_2$, and a mixture thereof. The etching rate may be controlled by adjusting the mixing of constituent elements or a composition ratio of the mixture.

An undercut is formed so that the photoresist patterns 122 and 124 protrude from the passivation layer pattern 70, and an area of the exposed drain electrode expanded part 67 is increased. Due to the above-mentioned etching, the drain electrode expanded part 67 is exposed and the first insulating substrate 10 of the pixel region is exposed. In addition, the control patterns 91 are formed.

Figure 17:
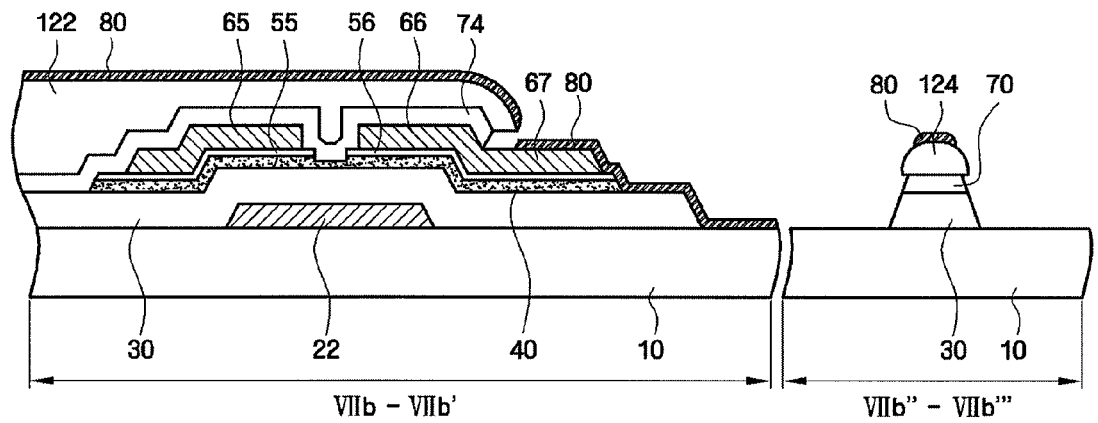

Subsequently, with reference to FIGS. 17 and 7B, the photoresist patterns 122 and 124 and the conductive substance 80 for pixel electrode that is provided on the photoresist patterns are removed using a lift off process. When a stripper that contains, for example, amines or glycols, is injected to the above-mentioned cut portion using a spray process or a dip process to come into contact with the photoresist patterns 122 and 124, the photoresist pattern 122 is dissolved by the stripper to be separated from the passivation layer 70 and, at the same time, to remove the conductive substance 80 for pixel electrode that is provided on the photoresist pattern 122.

The control patterns 91 form the space in which the stripper is capable of easily coming into contact with the photoresist patterns 122 and 124, and reduce a difference in height between the first region 7 and the second region 8 to reduce a difference in concentration of the stripper in both regions. Therefore, the photoresist patterns 122 and 124 that remain in the first region 7 and the second region 8 are efficiently removed.

In the method of producing the above-mentioned first display panel, the formation of the control patterns 91 using the gate insulating layer 30 and the passivation layer 70 is described. However, the control patterns 91 may be formed during the process of forming the gate wiring lines 21 and 22, the data wiring lines 62, 65, and 66, or the semiconductor layer 40 according to the type of material constituting control patterns. The indentation portions 93 that are provided in the control patterns 91 are formed during the etching process that is performed to form the control patterns 91.

Figure 18A:
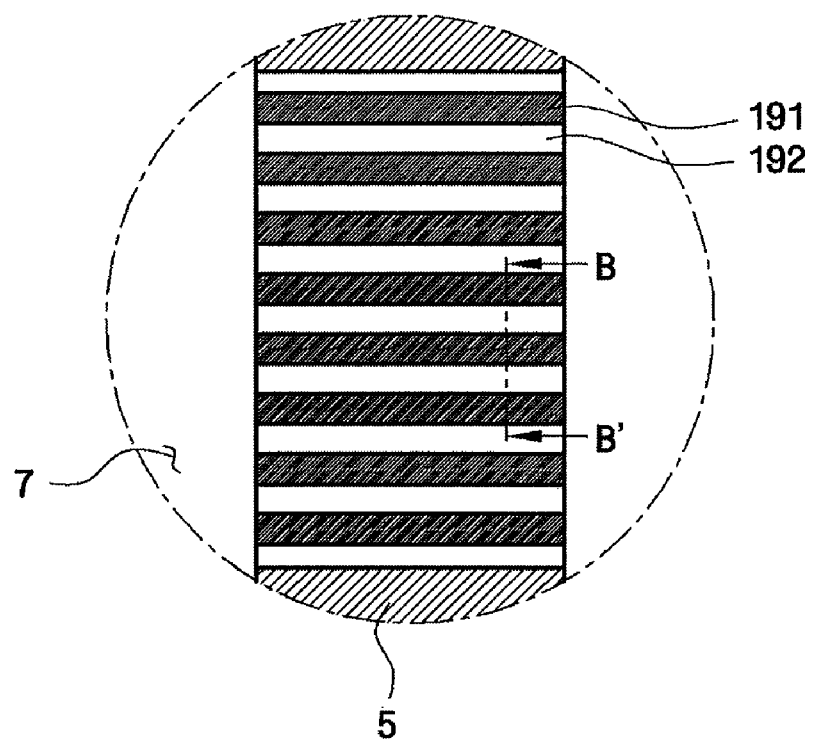
FIG. 18A is a plan view of a portion of the liquid crystal panel according to a first modified embodiment of FIG. 1B.
Figure 18B:
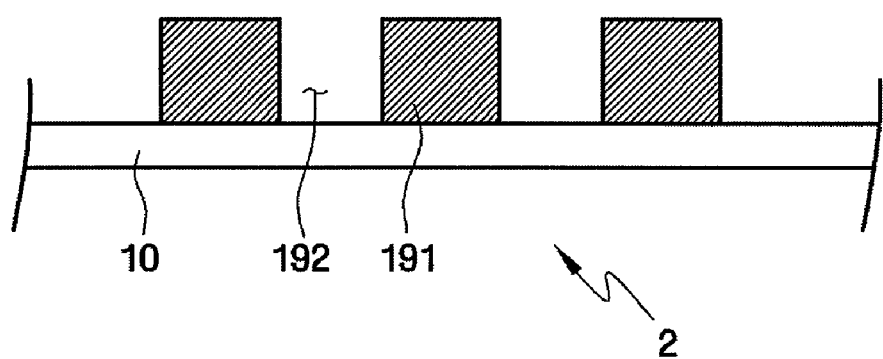
FIG. 18B is a cross-sectional view of the liquid crystal panel of FIG. 18A taken along the line B-B'.

A first display panel according to a first modified embodiment of the present invention will be described with reference to FIGS. 18A and 18B hereinafter. FIG. 18A is a plan view of a portion of the liquid crystal panel according to a first modified embodiment of FIG. 2A, and FIG. 18B is a cross-sectional view of the liquid crystal panel of FIG. 18A taken along the line B-B'.

The control patterns 191 of the first display panel 2 according to the first modified embodiment of the present invention each have the stripe shape, connect the first region 7 to the outside, and are a non-hollow solid type. The control patterns 191 may be formed to have a small width and relatively large space portions 192 may be formed in order to allow a liquid substance such as the liquid crystal 4 or the sealing agent 5 to desirably flow.

Figure 19A:
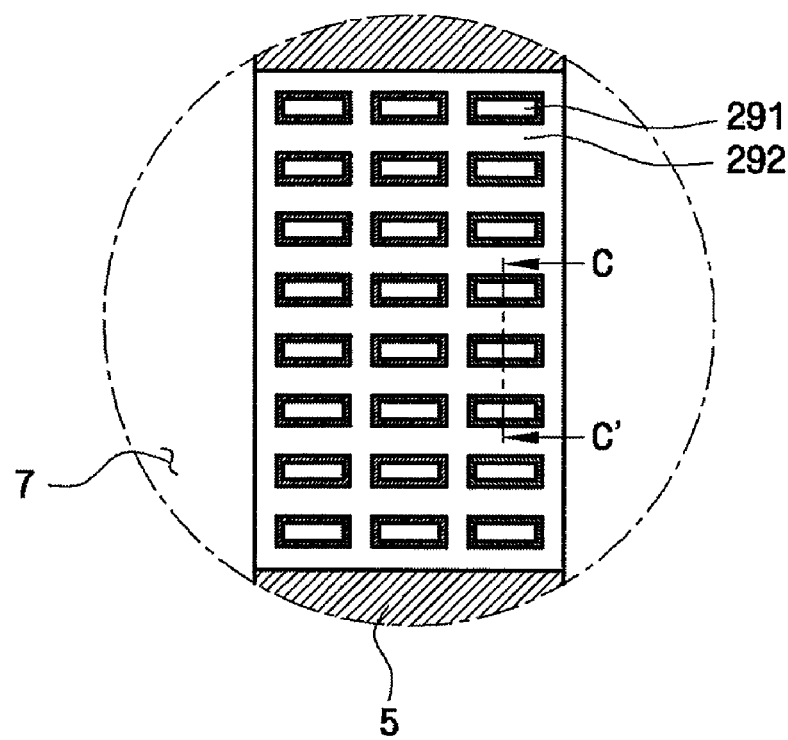
FIG. 19A is a plan view of a portion of the liquid crystal panel according to a second modified embodiment of FIG. 1B.
Figure 19B:
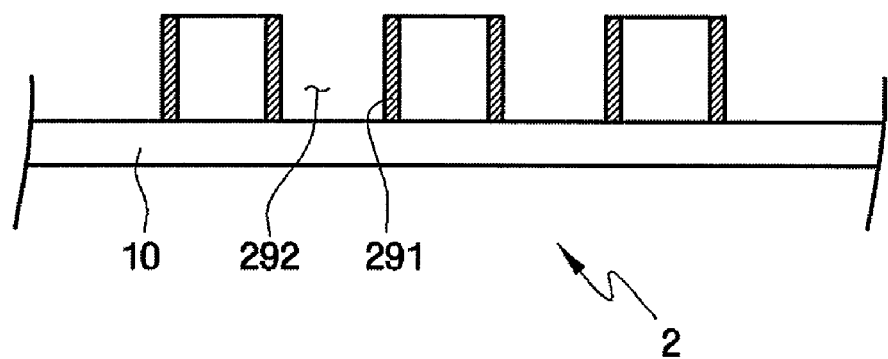
FIG. 19B is a cross-sectional view of the liquid crystal panel of FIG. 19A taken along the line C-C'.

A first display panel according to a second modified embodiment of the present invention will be described with reference to FIGS. 19A and 19B hereinafter. FIG. 19A is a plan view of a portion of the liquid crystal panel according to the second modified embodiment of FIG. 2A, and FIG. 19B is a cross-sectional view of the liquid crystal panel of FIG. 19A taken along the line C-C'.

Each of the control patterns 291 of the first display panel 2 according to the second modified embodiment of the present invention has a stripe structure that includes the indentation 293, and a rectangular cross-section.

The control patterns 291 may be arranged in a plurality of columns between the first region 7 and the outer region. That is, a stripe type of control pattern 291 including the indentation 293 is divided. If the control pattern 291 is divided, since the number of walls acting as the resistor is increased between the first region 7 and the outer region, it is preferable that the control patterns 291 be disposed at regular intervals to allow the liquid crystal 4 or the sealing agent 5 to flow therebetween. It is preferable to divide the control pattern 291 so that one stripe is divided into 3 to 5 pieces. The type of arrangement of the control patterns 291 or the width of the space portion 292 between the control patterns 291 may vary according to the size of the first display panel 2.

Figure 20A:
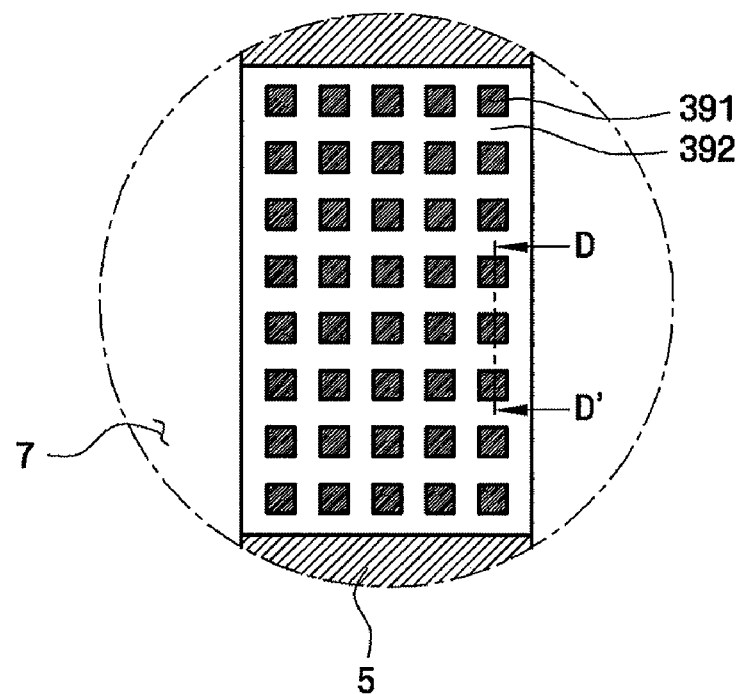
FIG. 20A is a plan view of a portion of the liquid crystal panel according to a third modified embodiment of FIG. 1B.
Figure 20B:
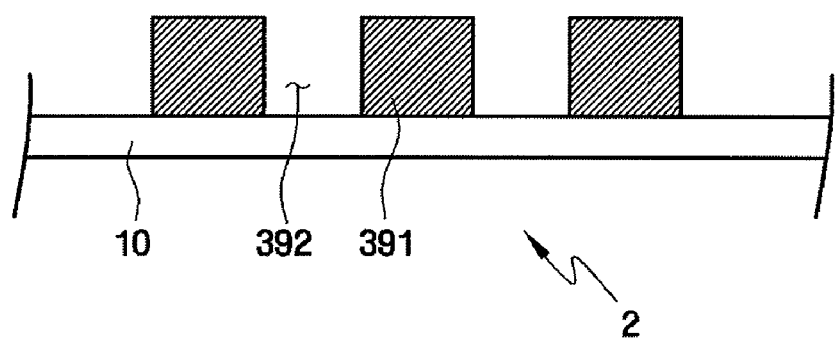
FIG. 20B is a cross-sectional view of the liquid crystal panel of FIG. 20A taken along the line D-D'.

A first display panel according to a third modified embodiment of the present invention will be described with reference to FIGS. 20 and 20B hereinafter. FIG. 20A is a plan view of a portion of the liquid crystal panel according to the third modified embodiment of FIG. 2A, and FIG. 20B is a cross-sectional view of the liquid crystal panel of FIG. 20A taken along the line D-D'.

The cross-section of each of control patterns 391 of the first display panel 2 according to the third modified embodiment of the present invention has a rectangular or a circular shape, and the arrangement of the control patterns is a dot-type of arrangement.

Each of the control patterns 391 has a predetermined sectional area, and the arrangement of a plurality of control patterns 391 is performed in the dot type like a matrix including a plurality of rows and columns. When the control patterns 391 are arranged in the dot type form, since the intervals between the control patterns 391 are enlarged, the liquid crystal 4 or the sealing agent 5 desirably flows. With the dot arrangement, the control patterns 391 may not be arranged in a lattice form. Considering the total sectional area of the control patterns 391 and the desirable flow of the liquid crystal 4 or the sealing agent 5, various types of control patterns may be used. It is preferable that at least a side of each of the control patterns 391 be 90 µm or less.

Although the present invention has been described in connection with the exemplary embodiments of the present invention, it will be apparent to those skilled in the art that various modifications and changes may be made thereto without departing from the scope and spirit of the invention.

As described above, in a liquid crystal display according to embodiments of the present invention, a control pattern is provided in a liquid crystal injection opening through which allow the liquid crystal and a sealing agent to flow in a desirable manner, thereby preventing the occurrence of defects caused by the liquid crystal or the inflow of a washing solution to remain due to a poor process margin.

What is claimed is:

1. A liquid crystal display comprising:
    a first display panel including a plurality of thin film transistors, wherein the first display panel comprises:
    a gate line formed on a substrate,
    a gate insulating layer formed on the gate line,
    a semiconductor layer formed on the gate insulating layer,
    an ohmic contact formed on the semiconductor layer,
    a data line, a source electrode, and a drain electrode formed on the ohmic contact,
    a passivation layer formed on the data line, the source electrode, the drain electrode, and the exposed semiconductor layer,
    a pixel electrode formed on the substrate, and connected to the drain electrode,
    a liquid crystal injection opening formed in a portion outside a region where the plurality of thin film transistors are formed, and
    a plurality of control patterns formed in the liquid crystal injection opening; and
    a second display panel disposed to face the first display panel,
    wherein the pixel electrode does not overlap the passivation layer,
    wherein the plurality of control patterns are made of substantially same substances as at least one of the gate insulating layer and the passivation layer,
    wherein the control patterns have indentations, and
    wherein a space portion are formed between the control patterns.

2. The liquid crystal display of claim 1, wherein the control patterns each have a stripe shape.

3. The liquid crystal display of claim 2, wherein the control patterns are formed so that strips extend outward from the region where the plurality of thin film transistors is formed.

4. The liquid crystal display of claim 3, wherein a length of each of the control patterns is 1 to 2 mm.

5. The liquid crystal display of claim 4, wherein a width of each of the control patterns is 50 to 100 µm.

6. The liquid crystal display of claim 1, wherein the control patterns are arranged in a matrix form and each has a dot shape.

7. The liquid crystal display of claim 6, wherein at least a side of each of the control patterns has a length of 90 µm or less.

8. The liquid crystal display of claim 1, wherein the control patterns are made of silicon nitride or silicon oxide.

9. The liquid crystal display of claim 1, wherein a height of each of the control patterns is in the range of 0.2 to 1.0 µm.

* * * * *